(12) United States Patent
Nomura et al.

(10) Patent No.: US 9,180,852 B2
(45) Date of Patent: Nov. 10, 2015

(54) ELECTRIC BOOSTER

(71) Applicant: HITACHI AUTOMOTIVE SYSTEMS, LTD., Ibaraki (JP)

(72) Inventors: Daichi Nomura, Kawasaki (JP); Takuya Usui, Yokohama (JP); Toshiyuki Ajima, Ibaraki (JP); Hidefumi Iwaki, Hitachinaka (JP); Kazuhiko Nakano, Isesaki (JP); Hirohumi Watanabe, Isesaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 341 days.

(21) Appl. No.: 13/751,669

(22) Filed: Jan. 28, 2013

(65) Prior Publication Data

US 2013/0192222 A1 Aug. 1, 2013

(30) Foreign Application Priority Data

Jan. 31, 2012 (JP) ................................. 2012-018910

(51) Int. Cl.
*B60T 13/74* (2006.01)
*B60T 8/40* (2006.01)

(52) U.S. Cl.
CPC ............. *B60T 13/745* (2013.01); *B60T 8/4077* (2013.01)

(58) Field of Classification Search
CPC .... B60T 13/745; B60T 13/662; B60T 13/746
USPC ..................................... 60/538, 545
See application file for complete search history.

(56) References Cited

U.S. PATENT DOCUMENTS

2008/0302100 A1* 12/2008 Ohtani et al. ................... 60/545
2009/0217659 A1* 9/2009 Ohno et al. .................... 60/545

FOREIGN PATENT DOCUMENTS

JP 2009-202867 9/2009

* cited by examiner

*Primary Examiner* — Thomas E Lazo
(74) *Attorney, Agent, or Firm* — Wenderoth, Lind & Ponack, L.L.P.

(57) ABSTRACT

An electric booster includes a housing having one end including a coupling surface where the housing is coupled to a master cylinder, and the other end including an attachment surface where the housing is attached to a vehicle. A controller includes a flat plate-like control board, and the control board is disposed so as to be positioned between a first plane including the attachment surface of the housing where the housing is attached to the vehicle, and a second plane including the coupling surface of the housing where the housing is coupled to the master cylinder.

19 Claims, 4 Drawing Sheets

ELECTRIC BOOSTER

BACKGROUND OF THE INVENTION

1. Technical Field

The present invention relates to an electric booster mounted on a brake apparatus of a vehicle such as an automobile, and configured to use an electric motor as its operation source for boosting.

2. Background Art

As a booster mounted on a brake apparatus of a vehicle such as an automobile to function to reduce a force that a driver should exert to operate a brake pedal, there is known an electric booster using an electric motor as its boosting source. For example, as disclosed in Japanese Patent Public Disclosure No. 2009-202867, the electric booster controls an operation of the electric motor by a controller based on an operation amount applied on the brake pedal, which is detected by a sensor, to thrust a piston of a master cylinder to generate a brake hydraulic pressure, thereby supplying the brake hydraulic pressure to a hydraulic brake of each wheel to generate a desired brake force.

Further, the electric booster disclosed in Japanese Patent Public Disclosure No. 2009-202867 includes a controller (ECU) having a horizontally disposed control board.

However, in a case where an electric booster including a horizontally disposed control board, like the electric booster disclosed in Japanese Patent Public Disclosure No. 2009-20286, is attached to, for example, a dash panel at a vehicle body side, the attachment of the control board is provided only at the vehicle body side, resulting in a cantilevered support structure. In this case, a vibration of a vehicle body causes generation of a large moment load to easily generate a vibration and a noise, thereby leading to the necessity of a stronger structure.

SUMMARY OF INVENTION

According to an aspect of the present invention, an electric booster, which is configured to control an electric motor by a controller based on an operation of a brake pedal of a vehicle to thrust a piston of a master cylinder, includes the electric motor, a conversion mechanism configured to convert a driving force of the electric motor into a thrust force of the piston, the controller, and a housing having one end including a coupling surface where the housing is coupled to the master cylinder, and the other end including an attachment surface where the housing is attached to the vehicle. The controller includes a flat plate-like control board, and the control board is disposed so as to be positioned between a first plane including the attachment surface of the housing where the housing is attached to the vehicle, and a second plane including the coupling surface of the housing where the housing is coupled to the master cylinder.

According to another aspect of the present, invention, an electric booster includes a master cylinder supplying a hydraulic pressure to a wheel cylinder of a vehicle in response to a thrust of a piston, an electric motor, a conversion mechanism converting a driving force of the electric motor into a thrust force of the piston, a stroke sensor detecting an operation amount of a brake pedal of a vehicle, a controller controlling the electric motor based on a detection value of the stroke sensor, and a housing having one end including a coupling surface where the housing is coupled to the master cylinder, and the other end including an attachment surface where the housing is attached to the vehicle. The controller includes a flat plate-like control board, and is mounted on the housing in such a manner that the control board is positioned between the attachment surface of the housing where the housing is attached to the vehicle, and the coupling surface where the housing is coupled to the master cylinder.

According to still another aspect of the present invention, an electric booster, which is configured to control an electric motor by a controller based on an operation of a brake pedal of a vehicle to thrust a piston of a master cylinder, includes the electric motor, a conversion mechanism configured to convert a driving fares of the electric motor into a thrust force of the piston, the controller, and a housing having one end including a coupling surface where the housing is coupled to the master cylinder, and the other end including an attachment surface where the housing is attached to the vehicle. The controller includes a flat plate-like control board, and the control board is disposed so as to be positioned between the attachment surface of the housing where the housing is attached to the vehicle, and the coupling surface of the housing where the housing is coupled to the master cylinder, in an axial direction of the housing.

DESCRIPTION OF EMBODIMENTS

In the following description, embodiments of the present invention will be described in detail with reference to the accompanying drawings.

Figure 1:
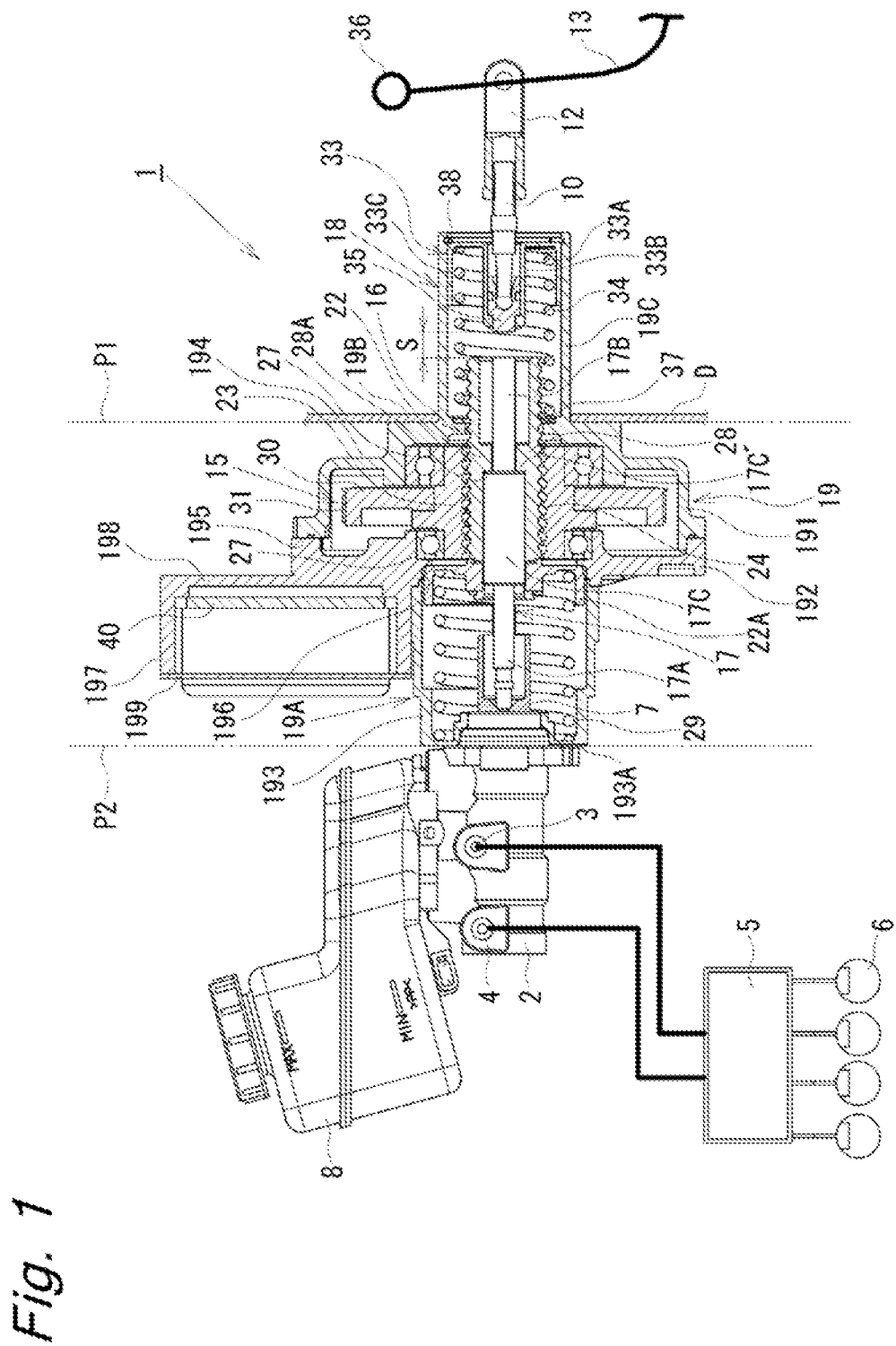
FIG. 1 is a vertical cross-sectional view of an electric booster according to a first embodiment.

An electric booster according to a first embodiment of the present invention is used with a brake apparatus of an automobile (vehicle). FIG. 1 illustrates the electric booster 1 according to the present, embodiment with a master cylinder 2 and a brake pedal 13 each mounted on the electric booster 1. A hydraulic brake 6 at each wheel is connected to the master cylinder 2 via a hydraulic control unit 5. The electric booster 1 and the master cylinder 2 may be integrally assembled, and this assembly may be treated as a single electric booster.

Figure 2:
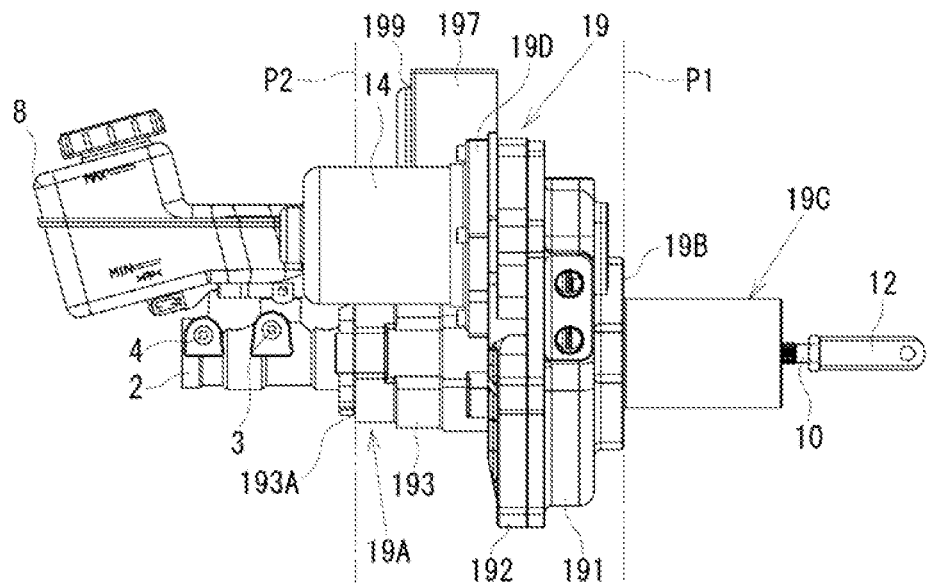
FIG. 2 is a side view of the electric booster illustrated in FIG. 1.
Figure 3:
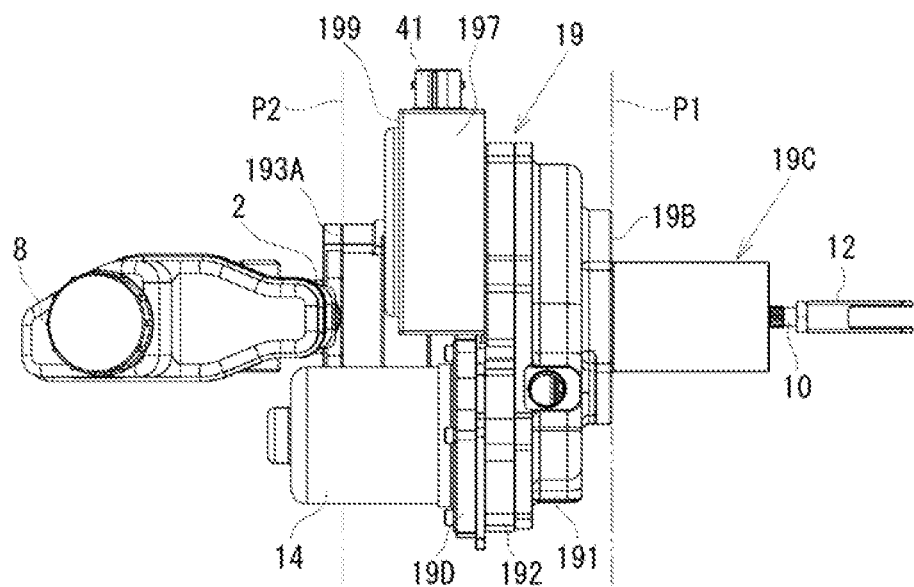
FIG. 3 is a plane view of the electric booster illustrated in FIG. 1.
Figure 4:
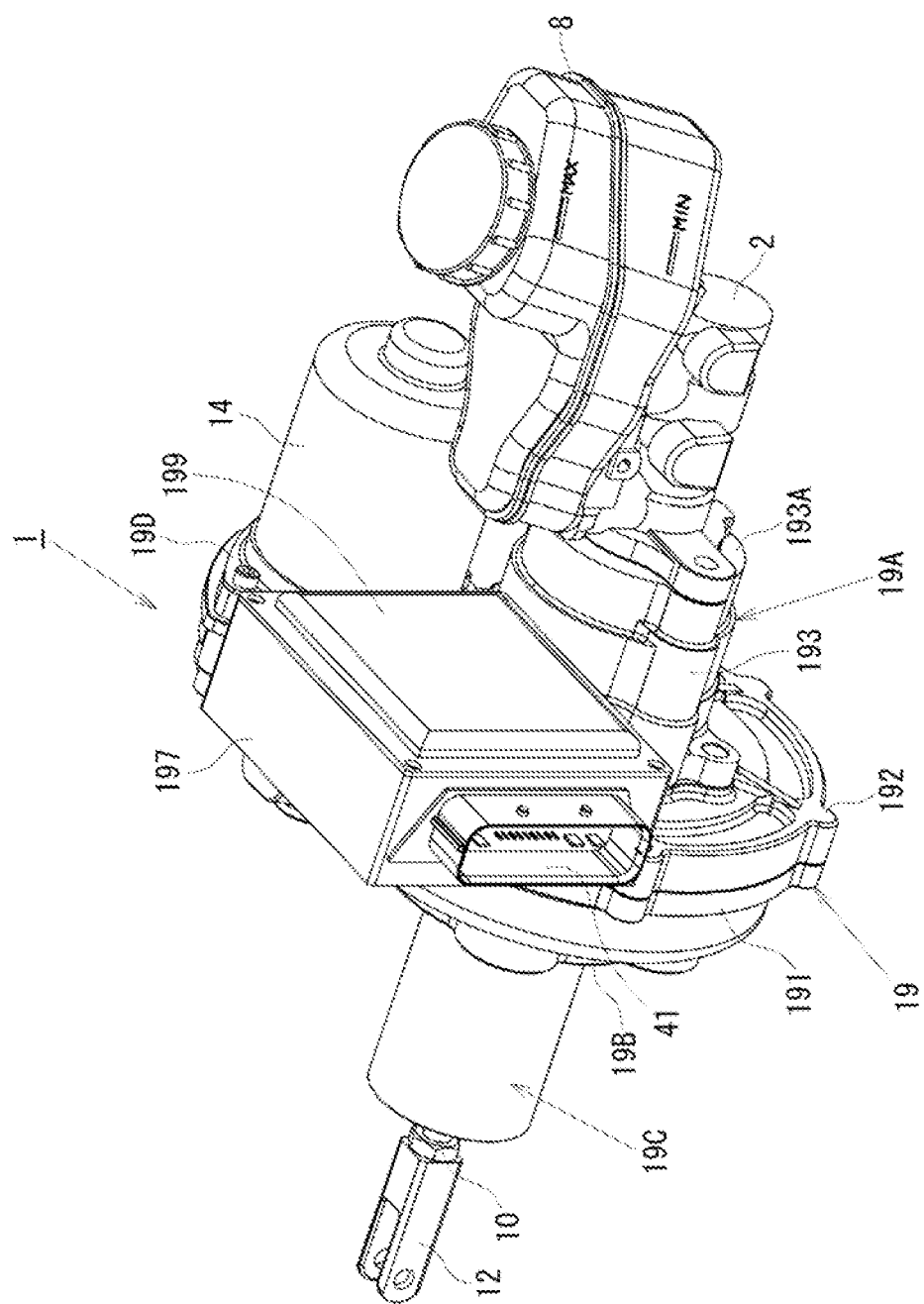
FIG. 4 is a perspective view of the electric booster illustrated in FIG. 1.

FIGS. 2 to 4 illustrate the electric booster 1 and the master cylinder 2 alone. As will be used herein, the terms "front" and "front side" are defined to indicate a direction toward the front of the vehicle to which the electric booster 1 is mounted, and the terms "rear" and "rear side" are defined to indicate a direction toward the rear of the same vehicle.

Referring to FIGS. 1 to 4, the master cylinder 2 is a tandem-type master cylinder, and includes two primary and secondary hydraulic ports 3 and 4. The hydraulic brake 6 disposed at each of four wheels is connected to the hydraulic ports 3 and 4 via the hydraulic control unit 5 including two systems of hydraulic circuits. The hydraulic brake 6 can be embodied by a brake capable of generating a brake force by a hydraulic pressure, such as a known disk brake or a drum brake. It should be noted that the master cylinder 2 may be a single-type master cylinder, and the hydraulic brake 6 may be disposed only at the front two wheels, using an electric brake or another type of brake at each of the rear wheels.

A pair of primary and secondary pistons 7 (FIG. 1 illustrates only a protruding end of the primary side), which are disposed in series, are inserted in the tandem-type roaster cylinder 2. Forward movements of these pistons 7 cause a same hydraulic pressure to be supplied from the two hydraulic ports 3 and 4. When the pistons 7 move rearward, brake fluid is supplied from a reservoir 8 according to, for example, wear of brake pads of the hydraulic brake 6 as necessary. Then, even if a failure occurs at one of the two systems of hydraulic circuits, the supply of the hydraulic pressure can continue by the other hydraulic circuit, thereby maintaining the brake function.

The hydraulic control unit 5 includes an electric pump, which is a hydraulic pressure source, a pressure increase valve, and an electromagnetic control valve such as a pressure reduction valve. The hydraulic control unit 5 performs a pressure reduction mode for reducing the hydraulic pressure to be supplied to the hydraulic brake 6 at each wheel, a retention mode for retaining the hydraulic pressure to be supplied to the hydraulic brake 6 at each wheel, and a pressure increase mode for increasing the hydraulic pressure to be supplied to the hydraulic brake 6 at each wheel, as necessary. Based on execution of these modes, the hydraulic control unit 5 provides various kinds of control such as brake force distribution control and anti-lock brake control.

The electric booster 1 extends through a dash panel D, which is a partitioning wall dividing an engine room and a vehicle compartment in the vehicle, and is fixed to the dash panel D with the master cylinder 2 placed within the engine room and the opposite input rod 10 placed within the vehicle compartment. A brake pedal 13 is coupled to the input rod 10, which is an input member, via a crevice 12.

The electric booster 1 includes an electric motor 14, a ball-screw mechanism 16, a pressing member 17, a stroke simulator 18, and a control board 40. The electric motor 14 functions to drive the piston 7 of the master cylinder 2. The ball-screw mechanism 16 is a conversion mechanism for converting a rotational movement into a linear movement by being driven by the electric motor 14 via a belt transmission mechanism 15. The pressing member 17 presses the piston 7 by being thrust by the ball-screw mechanism 16. The stroke simulator 18 is a reaction force generation mechanism coupled to the input rod 10. The control board 40 is a controller for controlling the electric motor 14. In the present first embodiment, the belt transmission mechanism 15, the ball-screw mechanism 16, the pressing member 17, the stroke simulator 18, and the control board 40 are contained in a housing 19, while the electric motor 14 is disposed outside the housing 19. However, the electric motor 14 may be contained within the housing 19 by integrating a case of the electric motor 14 with the housing 19 in a similar manner to a third embodiment, which will be described below.

The ball-screw mechanism 16, the pressing member 17, and the stroke simulator 18 are coaxially disposed in the housing 19. The master cylinder 2 is coupled to a front end of a cylindrical front portion 19A, which protrudes at a front portion of the housing 19. The input rod 10 protrudes rearward from a cylindrical rear portion 19C protruding from a flat attachment surface 19B formed at a rear portion of the housing 19.

The pressing member 17 is disposed coaxially with the piston 7 at the rear of the piston 7. A small-diameter rod portion 17A at the front side, a small-diameter portion 17B at the rear side, and a large-diameter portion 17C between them are integrally formed to constitute the pressing member 17. The small-diameter rod portion 17A is inserted in a cylindrical rear end of the piston 7, and is configured to press the piston 7.

The ball-screw mechanism 16 has a hollow structure including a cylindrical linearly movable member 22, a cylindrical rotational member 23, and balls 24 (steel balls) as a plurality of rolling bodies. The linearly movable member 22 is inserted in the rotational member 23. The balls 24 are disposed in spiral screw grooves formed between the linearly movable member 22 and the rotational member 23. The linearly movable member 22 is supported movably along an axial direction in the housing 19, at the same time, is supported so as not to rotate around the axis. A guide portion 28, which protrudes inwardly, is formed on an inner circumferential surface at a substantially central portion in the axial direction of the linearly movable member 22. The rotational member 23 is supported so as to be rotatable around the axis via bearings 27 and 27, and to be prevented from moving axially within the housing 19. Then, a rotation of the rotational member 23 causes rolling motions of the balls 24 in the screw grooves to thereby cause the linearly movable member 22 to move axially.

The small diameter portion 17B and the large diameter portion 17C of the pressing member 17 are inserted within the linearly movable member 22, and the large diameter portion 17C is slidably supported by an inner circumferential surface of the front side from the guide portion 28 of the linearly movable member 22. Further, the small diameter portion 17B is slidable along the axial direction on an inner circumferential surface of the guide portion 28. Then, a rear end annular surface 17C' of the larger diameter portion 17C of the pressing member 17 is in abutment with a front end annular surface 28A of the guide portion 28 of the linearly movable member 22. This abutment causes the linearly movable member 22 moving forward toward the master cylinder 2 to press the rear end annular surface 17C of the large diameter portion 17C, whereby the pressing member 17 moves forward together with the linearly movable member 22, and the small diameter rod portion 17A presses the piston 7 of the master cylinder 2. Further, the pressing member 17 can move forward alone without a movement of the linearly movable member 22 by separation of the large diameter portion 17C from the linearly movable member 22. A return spring 29, which is a compression coil spring, is disposed between a front end in the cylindrical front portion 19A of the housing 19 and a receiving member 22A disposed at a front end of the linearly movable member 22, and constantly biases the linearly movable member 22 backward, i.e., toward the cylindrical rear portion 19C of the housing 19.

A belt transmission mechanism 15 includes a rotational member-side pulley 30 integrally fixed to the rotational member 23, a motor-side pulley (not illustrated) integrally fixed to an output shaft of the electric motor 14, and a belt 31 wound around the pulleys. The electric motor 14 can be embodied by, for example, a known DC motor, a DC brushless motor, or an AC motor. The present embodiment employs a DC trustless motor in consideration of, for example, controllability, tranquility, and durability.

The rotational member-side pulley 30 is fixed at a position between bearings 27 and 27 on an outer circumferential surface of the rotational member 23. A motor flange 190 is formed at the housing 19 to enable attachment of the electric motor 14. The electric motor 14 is disposed at the side of the housing 19, i.e., at the periphery relative to the axis of the master cylinder 2 and the ball-screw mechanism 16, and is attached to the housing 19 via the motor flange 19D. Then, a rotational driving force of the electric motor 14 is transmitted to the rotational member 23 via the belt transmission mechanism 15.

The stroke simulator 18 is disposed in the cylindrical rear portion 19C of the housing 19. The stroke simulator 18 includes a bottomed cylindrical movable spring bearing 33, a flange-like fixed spring bearing 37, and a reaction force spring 34. The movable spring bearing member 33 is axially slidably inserted in the cylindrical rear portion 19C. The fixed spring bearing portion 37 is inserted in the cylindrical rear portion 19C, and is formed at an inner circumferential portion at a front end of the cylindrical rear portion 19C. The reaction force spring 34 is a compression coil spring disposed between the fixed spring bearing portion 37 and an annular bottom portion 33A of the movable spring bearing member 33.

The movable spring bearing member 33 includes a cylindrical rod receiving portion 33B, a cylindrical slidable cylinder portion 33C, and a rod receiving member 35. The cylindrical rod receiving portion 33B extends forward from an inner circumferential end of the annular bottom portion 33A. The slidable cylinder portion 33C extends forward from an outer circumferential end of the annular bottom portion 33A, and has an outer circumferential surface slidable on the inner circumferential surface of the cylindrical rear portion 19C. The rod receiving member 35 is fixedly fitted at a front end portion of the rod receiving portion 33B. A tip of the input rod 10 is coupled to the rod receiving member 35. The rod receiving member 35 (i.e., the rod receiving portion 33B) of the movable spring bearing member 33 is disposed coaxially with the pressing member 17, and a rear end surface of the small diameter portion 17B of the pressing member 17 and a front end surface of the rod receiving member 35 face each other. The annular bottom portion 33A is in abutment with the stopper 38, by which the retraction position of the movable spring bearing member 33 is regulated. Then, when the movable spring bearing member 33 is in a brake release position (a position where the movable spring receiving member 33 maximally retracts in abutment with the stopper 38) illustrated in FIG. 1, a predetermined space S is generated between the rear end surface of the small diameter portion 17B of the pressing member 17 and the front end surface of the rod receiving member 35 of the movable spring bearing member 33.

The electric booster 1 includes a resolver (not illustrated) and a stroke sensor 36. The resolver functions to detect a rotational angle of the output shaft of the electric motor 14. The stroke sensor 36 functions to detect a stroke of the input rod 10, i.e., an operation amount of the brake pedal 13. The electric booster can further include various kinds of sensors for detecting state amounts such as a hydraulic pressure in the master cylinder 2 as necessary. Then, the electric booster 1 controls the electric motor 14 by the control board 40, which is a controller, based on output signals of the above-described various kinds of sensors including the resolver, which functions to detect an rotational axis of the output shaft of the electric motor 14, and the stroke sensor 36.

Next, the housing 19 will be described in further detail. The housing 19 includes a rear housing 191 at the rear side, a front cover 192 at the front side, and a center housing 193 protruding forward from the central portion of the front cover 192 to form the cylindrical front portion 19A. The rear housing 191 has a substantially bottomed cylindrical shape, and contains the belt transmission mechanism 15 and the ball-screw mechanism 16. A rear end surface of a bottom surface 194 of the rear housing 191 forms the attachment surface 19B where the housing is attached to the dash panel D, and the cylindrical bottom portion 19C protrudes from, the central portion of the bottom portion 194.

The front cover 192 is a cover member coupled to an opening 195 of the rear housing 191. The front cover 192 includes a central opening 196 at the center thereof. The center housing 193 is coupled to the central opening 196. The motor flange 19D, to which the electric motor 14 is coupled, is formed adjacent to the side of the central opening 196. A case portion 197, which is a substantially cuboid body containing the control board 40 and has an opening at the front, is integrally formed at the front upper portion of the front cover 192. The control board 40 is mounted along a bottom portion 198 in the case portion 197. A cover 199 is attached to the opening of the case portion 197. A connector 41 (refer to FIG. 4) for a wire connection to the control board 40 is disposed at the side surface of the case portion 197 at the opposite side from the electric motor 14.

The bottom portion 198 of the case portion 197 and the control board 40 are disposed at the periphery relative to the axis of the master cylinder 2 and the ball-screw mechanism 16 along a plane perpendicular to the axial direction of the housing 19, the master cylinder 2, and the ball-screw mechanism 16 (hereinafter referred to as "the axial direction"), i.e., along a plane in parallel to the attachment surface 19B of the housing 19 where the housing 19 is attached to the dash panel D. Therefore, the axial dimension of the case portion 197 is sufficiently reduced, and the case portion 197 is disposed between the attachment surface 19B of the housing 19 where the housing 19 is attached to the dash panel D, and a coupling surface 193A formed at the center housing 193 of the housing 19 where the housing 19 is coupled to the master cylinder 2, in the axial direction of the housing 19. Further, the case portion 197 is disposed between a first plane P1, which includes the attachment surface 19B of the housing 19 where the housing 19 is attached to the dash panel D, and a second plane P2, which includes the coupling surface 193A formed at the center housing 193 of the housing 19 where the housing 19 is coupled to the master cylinder 2.

The control board 40 includes a control circuit where a power semiconductor element, and others are mounted. The control board 40 receives inputs of power, and detection signals and control signals from various sensors via the connector 41, and supplies a control current to the electric motor 14. The control board 40 is in close contact with the bottom portion 198 in the case portion 197 of the front cover 192, thereby transmitting heat generated by the power semiconductor element and others to the housing 19 to release the heat.

The center housing 193 has a substantially cylindrical shape. The center housing 193 is coupled to the central opening 196 of the front cover 192, and contains the small-diameter rod portion 17A of the pressing member 17 and the return spring 29. The master cylinder 2 is coupled to the coupling surface 193A of the front end of the center hosing 193. The rear portion of the primary-side piston 7 is inserted in the center housing 193.

In the present, embodiment, the housing 19 has a block construction constituted by the integrally coupled rear housing 191, front cover 192, and center housing 193. The case portion 197 is formed integrally with the front cover 192. Alternatively, the housing 19 may be integrally formed by or divided into any appropriate combination of these portions, and may be configured in such a manner that the respective portions can be further divided.

Next, an operation of the electric booster 1 will be described. A normal brake operation is performed in the following manner. When a driver operates the brake pedal 13, the stroke sensor 36 detects this operation amount, and the control board 40 controls an operation of the electric motor 14 according to the operation amount of the brake pedal 13 while monitoring a rotational position of the electric motor 14 by the resolver. Then, the ball-screw mechanism 16 is driven by the electric motor 14 via the belt transmission mechanism 15, which causes the linearly movable member 22 to move forward against the spring force of the return spring 29. Then, the pressing member 17 presses the piston 7, thereby generating a hydraulic pressure in the master cylinder 2. This hydraulic pressure is supplied to the hydraulic brake 6 at each wheel via the hydraulic control unit 5, thereby generating a brake force of the vehicle. At this time, the space S is maintained between the rear end surface of the small diameter portion 17B of the pressing member 17 and the front end surface of the rod receiving member 35 of the movable spring bearing member 33. Then, a predetermined reaction force is applied to the brake pedal 13 according to the operation amount of the brake pedal 13 by the spring force of the reaction force spring 34 of the stroke simulator 18. Therefore, the driver can generate a desired brake force by adjusting the operation amount of the brake pedal 13.

Further, the control board 40 changes a control amount of the electric motor 14 relative to an operation amount of the brake pedal 13, by which it is possible to perform regenerative control to obtain a desired brake force by reducing a hydraulic pressure in the master cylinder 2 by an amount corresponding to regenerative braking during regenerative braking, according which a generator is driven by a rotation of a wheel to collect a motion energy as power at the time of a speed reduction in a hybrid automobile and an electric automobile. At this time, the rear end surface of the small diameter portion 17B of the pressing member 17 is also out of abutment with the front end surface of the rod receiving member 35 of the movable spring bearing member 33, so the space S is maintained although the amount thereof is not constant. In this case, the vehicle has a deceleration according to the operation amount of the brake pedal 13 even if the hydraulic pressure in the master cylinder 2 changes by an amount corresponding to regenerative braking, so the reaction force of the brake pedal 13 applied by the reaction force spring 34 of the stroke simulator 13 does not bring an uncomfortable feeling to the driver.

In the above-described embodiment, the case portion 197 of the housing 19, which contains the control board 40, is disposed between the attachment surface 19B where the housing is attached to the dash panel D and the coupling surface 193A where the housing 19 is coupled to the master cylinder 2 in the axial direction of the housing 19. Therefore, the center of gravity of the electric booster 1 can be positioned closer to the attachment surface 19B. As a result, it is possible to reduce a moment load applied to the attachment portion 19B due to a vibration of the vehicle in the electric booster 1 supported at the attachment surface 19B in a cantilevered manner, whereby it is possible to prevent or reduce generation of a noise and a vibration. Further, since a resonance frequency of the electric booster 1 becomes sufficiently high relative to the frequency of a vibration of the vehicle, it is possible to prevent or reduce generation of a noise and a vibration due to a resonance. The control board 40 is arranged in close contact with the bottom portion 198 of the case portion 197, thereby increasing a heat release area by the housing 19 to improve the cooling efficiency. Further, the case portion 197 of the housing 19, which contains the control board 40, is disposed between the first plane P1 including the attachment surface 19B where the housing is attached to the dash panel D, and the second plane P2 including the coupling surface 193A where the housing is coupled to the master cylinder 2. Therefore, the center of gravity of the electric booster 1 can be positioned closer to the attachment surface 19B. As a result, it is possible to reduce a moment load applied to the attachment portion 19B due to a vibration of the vehicle in the electric booster 1 supported at the attachment surface 19B in a cantilevered manner, whereby it is possible to prevent or reduce generation of a noise and a vibration. Further, since a resonance frequency of the electric booster 1 becomes sufficiently high relative to the frequency of a vibration of the vehicle, it is possible to prevent or reduce generation of a noise and a vibration due to a resonance. The control board 40 is arranged in close contact with the bottom portion 198 of the case portion 197, thereby increasing a heat release area by the housing 19 to improve the cooling efficiency.

In the above-described first embodiment, the control board 40 is contained in the case portion 197 formed integrally with the housing 19. However, the control board 40 may be disposed outside the housing 19. This example corresponds to a second embodiment, which will be described below. More specifically, the second embodiment illustrated in FIG. 5 is configured in such a manner that the case portion 197 in the first embodiment is not disposed at a front cover 292 of an electric booster 1', and a control board case 200 is attached as a separate body from the front cover 292 constituting the housing 19.

The control board case 200 of the electric booster 1' includes a case body 297 formed so as to surround the control board 40, and a cover portion 299 covering an opening of the case body 297. The control board 40 is mounted along a bottom portion 298 of the case body 297.

In this way, the control board case 200 and the housing 19 are prepared as separate bodies, i.e., the control board 40 is disposed outside the housing 19, which allows separate execution of assembling of mechanical parts to the housing 19 and mounting the control board 40, which is constituted by electric parts, to the control board case 200, thereby improving the manufacturing efficiency of the electric booster 1'.

Figure 5:
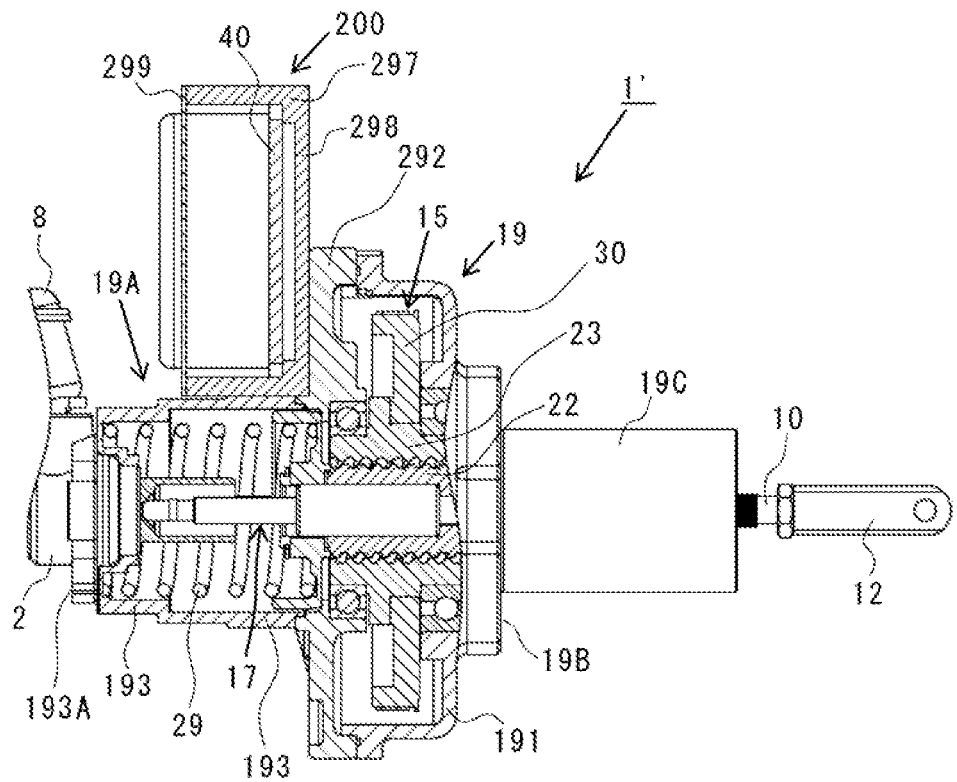
FIG. 5 is a partial cross-sectional view of an electric booster according to a second embodiment.

Similarly in the present embodiment, as illustrated in FIG. 5, the control board 40 is disposed between the attachment surface 19B of the housing 19 where the housing is attached to the dash panel D, and the coupling surface 193A formed at the center housing 193 of the housing 19 where the housing 19 is coupled to the master cylinder 2, in the axial direction of the housing 19. Further, the control board 40 is disposed between the first plane P1 including the attachment surface 19B of the housing 19 where the housing 19 is attached to the dash panel D, and the second plan P2 including the coupling surface 193A formed at the center housing 193 of the housing 19 where the housing 19 is coupled with the master cylinder 2. Therefore, the second embodiment provides a similar advantageous effect to the above-described first embodiment.

Figure 6:
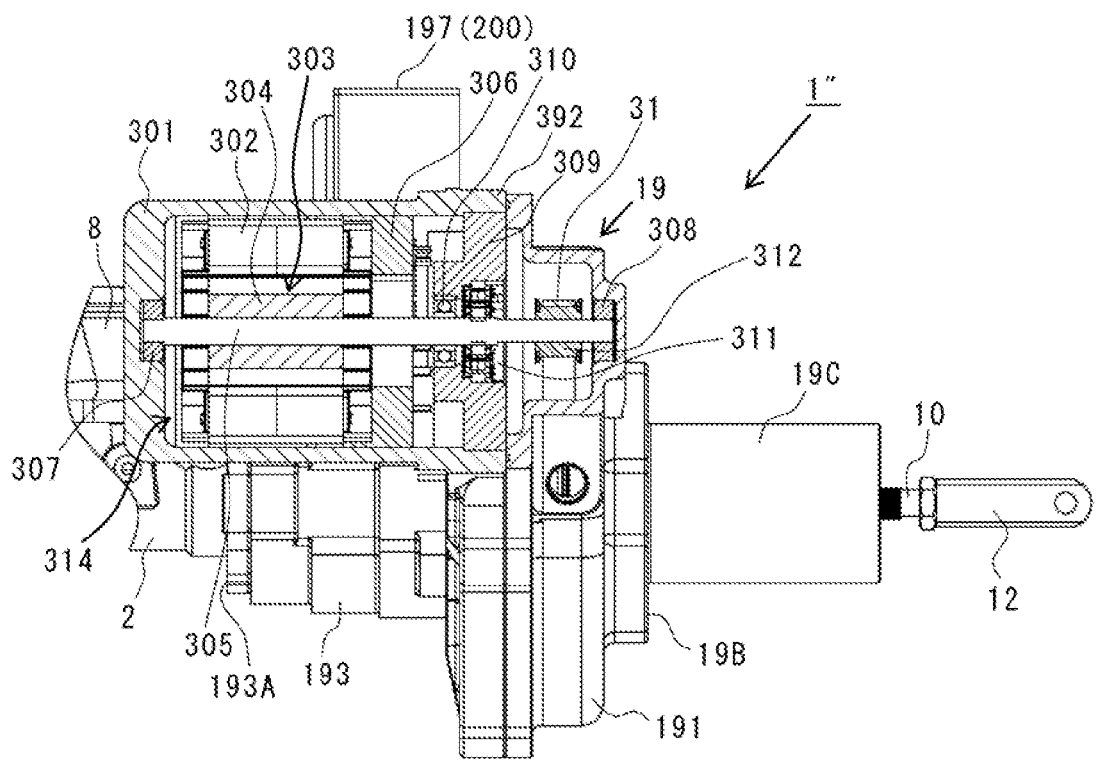
FIG. 6 is a partial cross-sectional view of an electric booster according to a third embodiment.

In the first embodiment, the electric motor 14 is attached outside the housing 19 via the motor flange 19D. However, the electric motor 14 may be contained within the housing 19. This example corresponds to a third embodiment, which will be described below. More specifically, the third embodiment illustrated in FIG. 6 is configured in such a manner that at front cover 392 of an electric booster 1" does not include the motor flange 19D in the first embodiment, and an electric motor 314 is contained within the front cover 392 constituting the housing 19.

The front cover 392 of the electric booster 1" includes a bottomed cylindrical motor case portion 301 which contains the electric motor 314. The electric motor 314 is a three-phase DC motor, and is fixed to an inner circumferential surface of the motor case portion 301. The electric motor 314 includes a stator 302 constituted by a plurality of coils, and a rotor 303 disposed on an inner circumference of the stator 302. The stator 302 includes a ring bus bar 306, which connects a plurality of coils for each of U, V, and W phases. The rotor 303 includes a plurality of permanent magnets 304 and a rotational rod 305. The plurality of permanent, magnets 304 rotate by an electromagnetic force generated by sequential supplies of a current to the coils of the respective phases of the stator 302. The permanent magnets 304 are fixedly attached to the rotational rod 305. The rotational rod 305 extends from a bottom portion of the motor case portion 301 of the front cover 392 to the rear housing 191. The both ends of the rotational rod 305 are pivotally supported by a bearing 307 disposed at the bottom portion of the motor case portion 301 and a bearing 308 disposed at the rear housing 191.

An annular support member 309, which is fixed to the housing 19 by being sandwiched between the motor case portion 301 and the rear housing 191, is disposed at an opening side of the motor case portion 301. A bearing 310, which pivotally supports the rotational rod 305, and a resolver 311, which detects a rotational angle of the rotational rod 305 serving as an output shaft of the electric motor 314, are disposed at the support member 309. A motor pulley 312, which is integrally fixed to the rotational rod 305 serving as an output shaft of the electric motor 314, and rotates together with the rotational rod 305, is disposed between the resolver 311 and the bearing 308 of the rotational rod 305.

In this way, the electric motor 314 is contained in the front cover 392, i.e., the electric motor 314 is contained in the housing 19, whereby it is possible to release heat generated by driving of the electric motor 314 to the front cover 392 having a relatively wide area, thereby improving the reliability of the electric booster 1".

The control board 40 is contained in the case portion 197 or the control board case 200. Similarly in the present embodiment, as illustrated in FIG. 6, the control board 40 is disposed between the attachment surface 19B of the housing 19 where the housing 19 is attached to the dash panel D, and the coupling surface 193A formed at the center housing 193 of the housing 19 where the housing 19 is coupled to the master cylinder 2, in the axial direction of the housing 19. Further, the control board 40 is disposed between the first plane P1 including the attachment surface 19B of the housing 19 where the housing 19 is attached to the dash panel D, and the second plan P2 including the coupling surface 193A formed at the center housing 193 of the housing 19 where the housing 19 is coupled with the master cylinder 2. Therefore, the third embodiment provides a similar advantageous effect to the above-described first embodiment.

The above-described respective embodiments have been described based on a so-called "Brake-by-Wire"-type electric booster, in which a brake hydraulic pressure in the master cylinder 2 is not directly transmitted to the brake pedal 13. However, the present invention is not limited thereto. The present invention can be also employed to an electric booster of a type that feeds back a part of a reaction force of a brake hydraulic pressure in the master cylinder 2 to the brake pedal 13, in a similar manner.

Further, the above-described respective embodiments have been described based on an example in which the first plane P1 and the second plane P2 extend in parallel with each, other, and the control board 40 is also disposed in parallel with each plane. However, in some vehicles, the surface for attachment to the vehicle body is inclined or the master cylinder 2 is obliquely disposed. In such vehicles, the first plane P1 and the second plane P2 may not extend in parallel to each other. Even in this case, the control board 40 is disposed between the attachment surface 19B of the housing 19 where the housing 19 is attached to the dash panel D, and the coupling surface 193A of the housing 19 where the housing 19 is coupled to the master cylinder 2 in the axial direction of the housing 19, by which it is possible to provide a similar advantageous effect to the above-described embodiments. Further, the control board 40 may be disposed a periphery relative to the conversion mechanism between the first plane P1 and the second plane P2.

According to the electric boosters of the above described embodiments, it is possible to prevent or reduce generation of a vibration and a noise.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2012-018910 filed on Jan. 31, 2012. The entire disclosure of No. 2012-018910 filed on Jan. 31, 2012 including specification, claims, drawings and summary is incorporated herein by reference in its entirety.

What is claimed is:

1. An electric booster configured to control an electric motor by a controller based on an operation of a brake pedal of a vehicle to thrust a piston of a master cylinder, the electric booster comprising:
   the electric motor;
   a conversion mechanism configured to convert a driving force of the electric motor into a thrust force of the piston;
   the controller; and
   a housing having one end including a coupling surface where the housing is coupled to the master cylinder, and the other end including an attachment surface where the housing is attached to the vehicle,
   wherein the controller includes a flat plate-like control board, and the control board is disposed so as to be positioned between a first plane including the attachment surface of the housing where the housing is attached to the vehicle, and a second plane including the coupling surface of the housing where the housing is coupled to the master cylinder, and
   wherein the control board is disposed in parallel with the first plane or the second plane.

2. The electric booster according to claim 1, wherein the electric motor and the control board are disposed at a periphery relative to an axis of the master cylinder.

3. The electric booster according to claim 1, wherein the control board is contained in the housing.

4. The electric booster according to claim 1, wherein the control board is disposed outside the housing.

5. The electric booster according to claim 1, wherein the electric motor is disposed outside the housing.

6. The electric booster according to claim 1, wherein the electric motor is contained in the housing.

7. An electric booster comprising:
   a master cylinder supplying a hydraulic pressure to a wheel cylinder of a vehicle in response to a thrust of a piston;
   an electric motor;
   a conversion mechanism converting a driving force of the electric motor into a thrust force of the piston;
   a controller controlling the electric motor based on an operation of a brake pedal of a vehicle; and a housing having one end including a coupling surface where the housing is coupled to the master cylinder, and the other end including an attachment surface where the housing is attached to the vehicle, wherein the controller includes a flat plate-like control board, and is mounted on the housing in such a manner that a flat plate surface of the control board extends along a plane perpendicular to an axial direction of the master cylinder between the attachment surface of the housing where the housing is attached to the vehicle, and the coupling surface where the housing is coupled to the master cylinder.

8. The electric booster according to claim 7, wherein the electric motor and the control board are disposed at a periphery relative to an axis of the master cylinder.

9. The electric booster according to claim 7, wherein the control board is contained in the housing.

10. The electric booster according to claim 7, wherein the control board is disposed outside the housing.

11. The electric booster according to claim 7, wherein the electric motor is disposed outside the housing.

12. The electric booster according to claim 7, wherein the electric motor is contained in the housing.

13. An electric booster comprising:

a master cylinder supplying a hydraulic pressure to a wheel cylinder of a vehicle in response to a thrust of a piston;

an electric motor;

a conversion mechanism converting a driving force of the electric motor into a thrust force of the piston;

a stroke sensor detecting an operation amount of a brake pedal of a vehicle;

a controller controlling the electric motor based on a detection value of the stroke sensor; and a housing having one end including a coupling surface where the housing is coupled to the master cylinder, and the other end including an attachment surface where the housing is attached to the vehicle, wherein the controller includes a flat plate-like control board, and is mounted on the housing in such a manner that the control board is positioned between the attachment surface of the housing where the housing is attached to the vehicle, and the coupling surface where the housing is coupled to the master cylinder, and wherein the control board is disposed in parallel with the attachment surface or the coupling surface.

14. The electric booster according to claim 13, wherein the electric motor is disposed at a periphery relative to an axis of the master cylinder, side by side with the control board.

15. The electric booster according to claim 13, wherein the control board is contained in the housing.

16. The electric booster according to claim 13, wherein the control board is disposed outside the housing.

17. The electric booster according to claim 13, wherein the electric motor is disposed outside the housing.

18. The electric booster according to claim 13, wherein the electric motor is contained in the housing.

19. An electric booster configured to control an electric motor by a controller based on an operation of a brake pedal of a vehicle to thrust a piston of a master cylinder, the electric booster comprising:

the electric motor;

a conversion mechanism configured to convert a driving force of the electric motor into a thrust force of the piston;

the controller; and a housing having one end including a coupling surface where the housing is coupled to the master cylinder, and the other end including an attachment surface where the housing is attached to the vehicle, wherein the controller includes a flat plate-like control board, and the control board is disposed so as to be positioned between the attachment surface of the housing where the housing is attached to the vehicle, and the coupling surface of the housing where the housing is coupled to the master cylinder, in an axial direction of the housing, and wherein the control board is disposed in parallel with the attachment surface or the coupling surface.

* * * * *